US009021745B2

(12) United States Patent
Harris et al.

(10) Patent No.: US 9,021,745 B2
(45) Date of Patent: May 5, 2015

(54) EXIT DEVICE MOUNT WITH CLOSED TERMINATION

(71) Applicant: Assa Abloy Inc., New Haven, CT (US)

(72) Inventors: Thomas Harris, Salem, VA (US); David Eveland, Salem, VA (US); John F. Kelly, III, Weddington, NC (US)

(73) Assignee: Assa Abloy Inc., New Haven, CT (US)

( * ) Notice: Subject to any disclaimer, the term of this patent is extended or adjusted under 35 U.S.C. 154(b) by 0 days.

(21) Appl. No.: 13/746,128

(22) Filed: Jan. 21, 2013

(65) Prior Publication Data

US 2014/0059937 A1 Mar. 6, 2014

Related U.S. Application Data

(60) Provisional application No. 61/693,944, filed on Aug. 28, 2012, provisional application No. 61/695,668, filed on Aug. 31, 2012.

(51) Int. Cl.
*E06B 3/00* (2006.01)
*E05B 9/02* (2006.01)
*E05D 15/00* (2006.01)
*E05B 65/10* (2006.01)
*B23B 47/28* (2006.01)
*E05B 9/08* (2006.01)
*E05B 17/06* (2006.01)

(52) U.S. Cl.
CPC . *E05B 9/02* (2013.01); *E05D 15/00* (2013.01); *E05B 65/1053* (2013.01); *B23B 47/28* (2013.01); *E05B 65/1046* (2013.01); *E05B 9/08* (2013.01); *E05B 17/06* (2013.01); *B23B 2247/06* (2013.01)

(58) Field of Classification Search
CPC ...... E05F 11/54; E05B 65/1053; E05B 17/06; E05B 79/06; E05B 9/082
USPC .................. 49/506, 394, 460; 292/92, 93, 94, 292/DIG. 53, DIG. 54; 29/525.01, 525.02, 29/525.11, 434, 407.1, 271
See application file for complete search history.

(56) References Cited

U.S. PATENT DOCUMENTS

| 2,621,357 | A | * | 12/1952 | Stuman | 16/422 |
|---|---|---|---|---|---|
| 3,986,318 | A | | 10/1976 | McConnell | |
| 4,083,590 | A | | 4/1978 | Folger | |
| 4,384,738 | A | | 5/1983 | Floyd | |
| 4,927,193 | A | | 5/1990 | Miller | |
| 6,052,948 | A | * | 4/2000 | Spitzley | 49/460 |
| 6,623,050 | B1 | * | 9/2003 | Peng | 292/92 |
| 6,860,528 | B2 | * | 3/2005 | O'Brien, II | 292/92 |

(Continued)

*Primary Examiner* — Katherine Mitchell
*Assistant Examiner* — Catherine A Kelly
(74) *Attorney, Agent, or Firm* — DeLio, Peterson & Curcio LLC; David R. Pegnataro

(57) ABSTRACT

An exit device includes a rail having opposite first and second ends and a rear portion with a first opening adjacent the first rail end for attachment to the door surface, the first rail end further having a front portion that inhibits access to the first rail opening in a direction normal to the rail rear portion. The method for installing it includes securing a mount having a cantilevered portion extending therefrom to the door at the surface first end such that the mount cantilevered portion provides a space between the cantilevered portion and the door and placing the rail against the door surface such that the mount extends through the first rail opening, sliding the rail to engage the rail rear portion adjacent the first rail opening between the mount cantilevered portion and the door and securing the second rail end to the door surface.

15 Claims, 8 Drawing Sheets

(56) References Cited

U.S. PATENT DOCUMENTS

| | | |
|---|---|---|
| 7,712,799 B2 | 5/2010 | Peng |
| 7,757,438 B2 * | 7/2010 | Syed et al. .................. 49/502 |
| 8,684,426 B2 * | 4/2014 | Morales, Jr. .................. 292/346 |
| 2007/0122250 A1 | 5/2007 | Mullner, Jr. |
| 2007/0183866 A1 | 8/2007 | Gallien |
| 2007/0273158 A1 * | 11/2007 | Berger .......................... 292/92 |

* cited by examiner

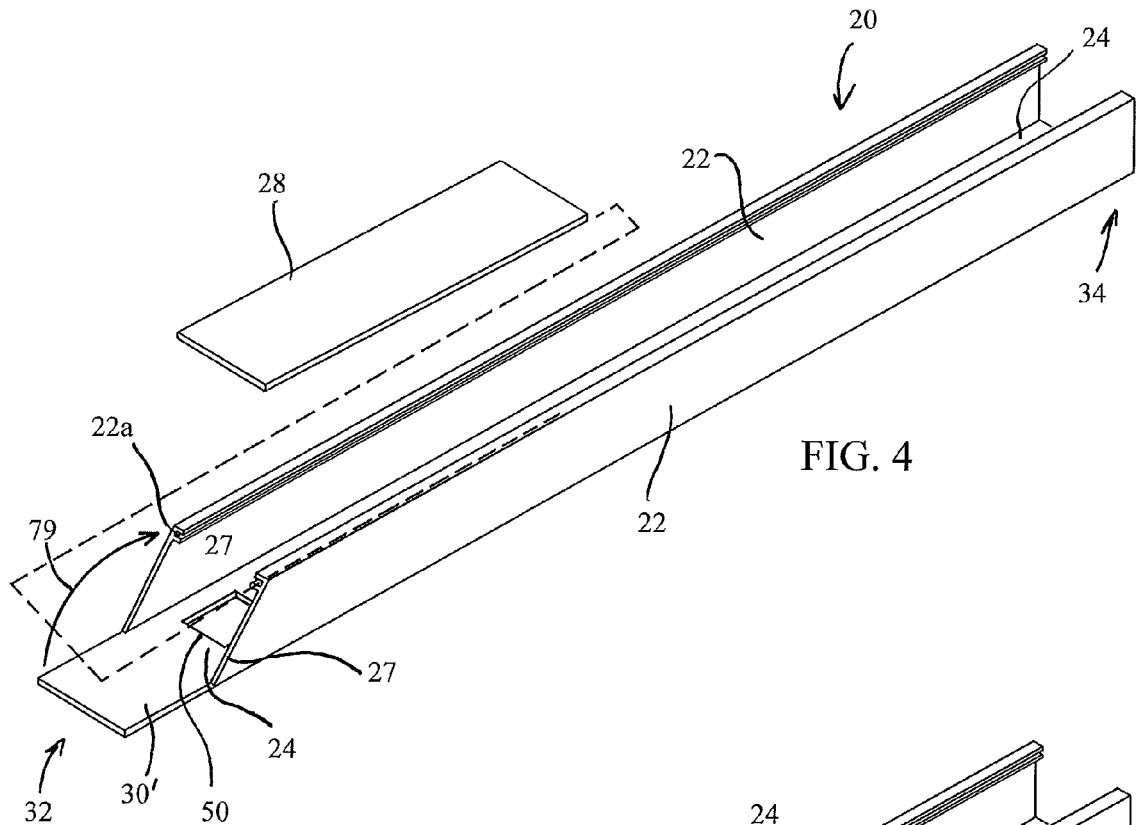
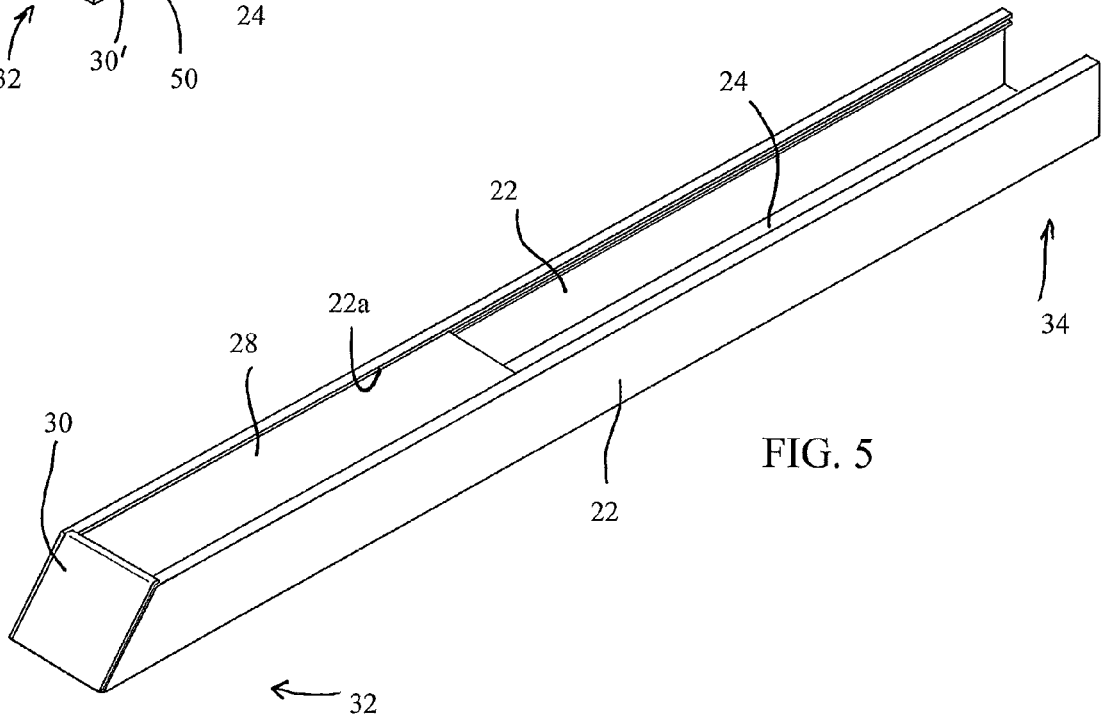

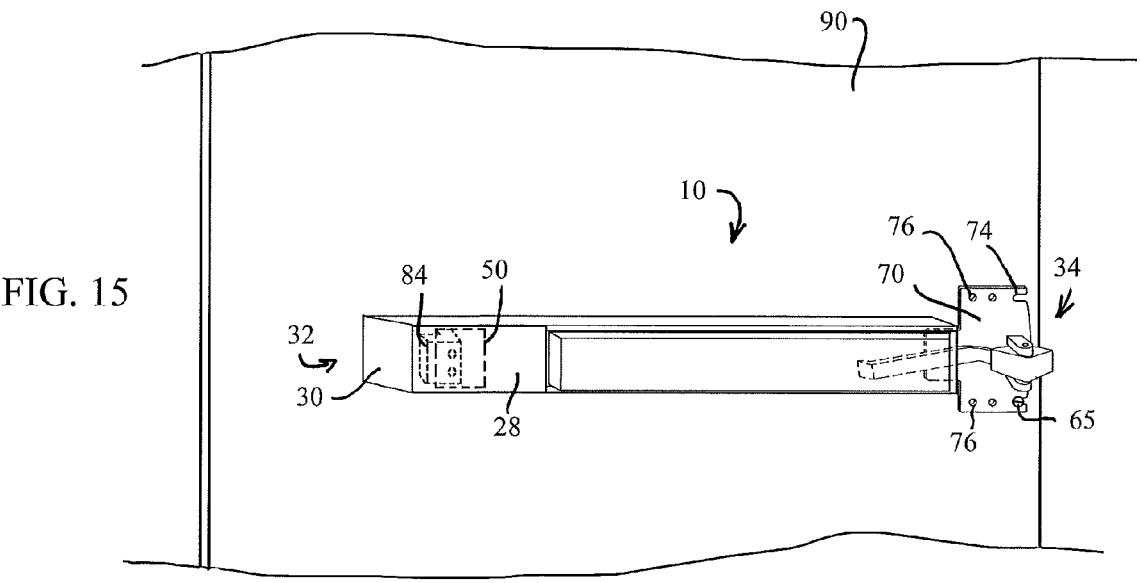
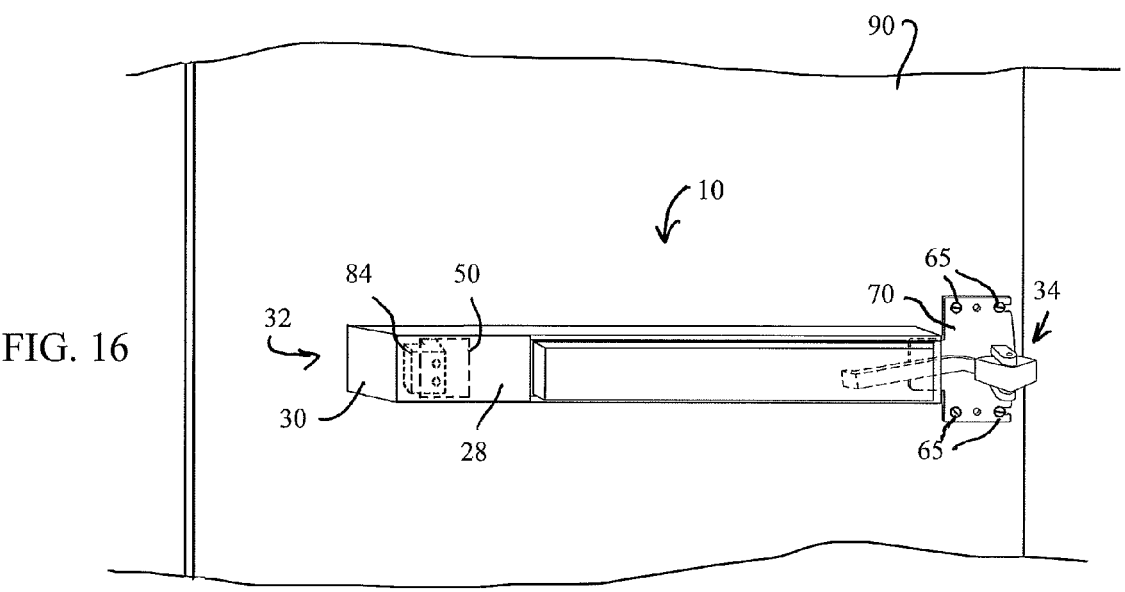

EXIT DEVICE MOUNT WITH CLOSED TERMINATION

BACKGROUND OF THE INVENTION

1. Field of the Invention

The present invention relates to an exit device for a door and a method of installation which includes mounting hardware not accessible through a front portion of the exit device. The inaccessible mounting hardware is enclosed within the exit device housing and the rail is covered by a permanent front panel and a permanent, fixed, closed termination of the rail end.

2. Description of Related Art

Typical prior art end caps for an exit rail bar are designed to be removable to accommodate field adjustments for different door widths. Such end caps are vulnerable to vandalism and general wear and tear. Methods of installing such exit rail bars rely on access to the interior of the rail to secure fasteners to the door, before the end caps are installed.

SUMMARY OF THE INVENTION

Bearing in mind the problems and deficiencies of the prior art, it is therefore an object of the present invention to provide an improved exit device having a rail with a non-removable termination and front portion at the end opposite the lock chassis, which prevents damage during the lifetime of the device.

It is another object of the present invention to provide an improved method of installing the rail securely to the door, where the interior of the rail is not directly accessible at the end opposite the lock chassis.

Still other objects and advantages of the invention will in part be obvious and will in part be apparent from the specification.

The above and other objects, which will be apparent to those skilled in the art, are achieved in the present invention which is directed to a method for installing an exit device on a door. The method includes providing a door having a substantially planar surface for mounting an exit device, the surface having a first end near a hinge and a second end opposite the hinge. The method includes providing an exit device including an elongated rail having opposite first and second ends and a rear portion with a first opening adjacent the first rail end for attachment to the door surface, the first rail end further having a front portion that inhibits access to the first rail opening in a direction normal to the rail rear portion. The method includes providing a mount having a cantilevered portion extending therefrom. The method includes securing the mount to the door at the surface first end such that the mount cantilevered portion provides a space between the cantilevered portion and the door and placing the elongated rail against the door surface such that the mount extends through the first rail opening. The method includes sliding the rail along the plane of the door surface to engage the rail rear portion adjacent the first rail opening between the mount cantilevered portion and the door and securing the second rail end to the door surface second end from movement along the plane of the door and prevent the first rail opening from disengaging from the mount.

The method may include providing a non-removable closed termination at the first end of elongated rail. The mount may comprise a base and the cantilevered portion may comprise a head extending outward from the base parallel to the plane of the door surface. The mount base may be circular and have an opening therein for securing the mount to the door surface, and the mount head may be circular and have a diameter larger that the diameter of the base. The mount may comprise a screw having a threaded shaft base, and the cantilevered portion may comprise a screw head extending outward from the threaded shaft base.

The first rail opening may include an opening having a diameter at least the diameter of the mount head and a contiguous slot having a width at least the diameter of the mount base and less than the diameter of the mount head. A portion of the rail rear portion adjacent the contiguous slot forms a cantilever spring extending from the opening having a diameter at least the diameter of the mount head.

The exit device rail rear portion may have a thickness, and the method may further include providing a tool having a thickness at least that of the rail rear portion thickness and using the tool to secure the mount to the door at the surface first end such to ensure that that the mount cantilevered portion provides a space between the cantilevered portion and the door such that the rail rear portion adjacent the first rail opening fits snugly between the mount cantilevered portion and the door.

The exit device rail rear portion may have a second opening in rear portion adjacent the second rail end wherein a fastener is inserted through the second rail opening to secure the second rail end to the door surface. The elongated rail first and second ends may extend in a first direction and the second opening in the rail rear portion may include a contiguous slot extending in a second direction perpendicular to the first direction. The elongated rail first and second ends may extend in a first direction, the second opening in rail rear portion comprising a slot extending from an edge near the second rail end in the first direction. The fastener may be inserted into the door prior to placing the rail against the door surface, and after sliding the rail along the plane of the door surface to engage the rail rear portion between the mount cantilevered portion and the door, the rail is fully supported from movement from the door.

The method may further include providing a marking door marker jig having a first alignment opening for marking a location on the door for the mount and a second alignment opening for marking a location on the door for the second opening, placing the jig on the door at a desired location so that the first alignment opening is adjacent the door surface first end and the second alignment opening is adjacent the door surface second end and marking the door surface through the first and second jig alignment openings. The method may include removing the door marker jig, securing the mount to the door surface at the mark for the mount, and securing the second opening fastener to the door surface at the mark for the second opening. The method may further include placing the second jig alignment opening adjacent a location for a lock chassis on the door surface second end, and aligning the jig substantially horizontally across the door surface. The door may include a door hardware prep opening and the door marker jig may include a protrusion for fitting into the prep opening. The method then includes placing the jig protrusion into the door prep opening before marking the door surface through the first and second jig alignment openings. The door marker jig may include a leveling device, and the method then includes aligning the jig horizontally using the leveling device by moving the end of the jig opposite the protrusion.

Another aspect of the invention is directed to an exit device for a door having a surface with hinge on one edge and a lock chassis opening on an opposite edge, the device comprising an elongated rail having a first end and a second end opposite the first end, the second end adapted to receive a lock chassis, the rail further having a rear portion for securing the device to the door surface with a slotted first opening in the rear portion adjacent the first rail end, the first rail end further having a non-removable front portion and closed termination that inhibit access to the rail first opening in a direction normal to the rail rear portion. The elongated rail first and second ends may extend in a first direction and there is included a second opening in the exit device at the second end having a contiguous slot extending in the first direction. The exit device may further include a door marker jig having a first alignment opening for marking a location on the door for the slotted first opening and a second alignment opening for marking a location on the door for the second opening. The door marker jig may also include a protrusion for fitting into a door prep opening and/or a leveling device.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a front bottom perspective view of an exit device rail showing the open end before the end piece is folded against the end of the rail sides according to the present invention.

FIG. 5 is a front bottom perspective view of the exit device rail showing the end piece after it is folded against the end of the rail sides in its final position to create a permanent, fixed, closed termination at the end, according to the present invention.

FIG. 15 shows a sixth step for the installation of the exit device according to the present invention.

FIG. 16 shows a seventh step for the installation of the exit device according to the present invention.

DESCRIPTION OF THE PREFERRED EMBODIMENT(S)

In describing the preferred embodiment of the present invention, reference will be made herein to FIGS. 1-20 of the drawings in which like numerals refer to like features of the invention.

Figure 1:
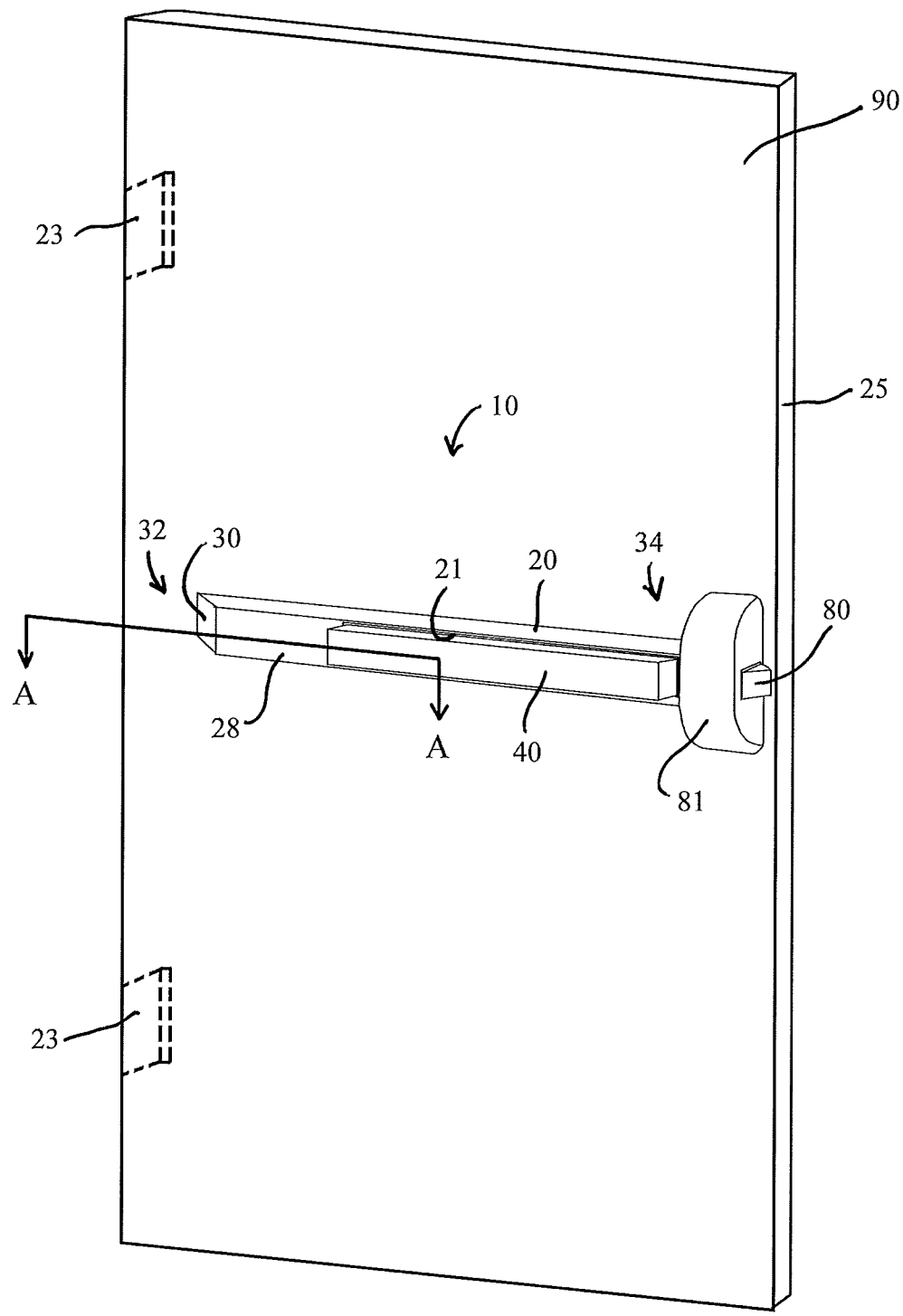
FIG. 1 is a front perspective view of the exit device on a door according to the present invention.
Figure 2:
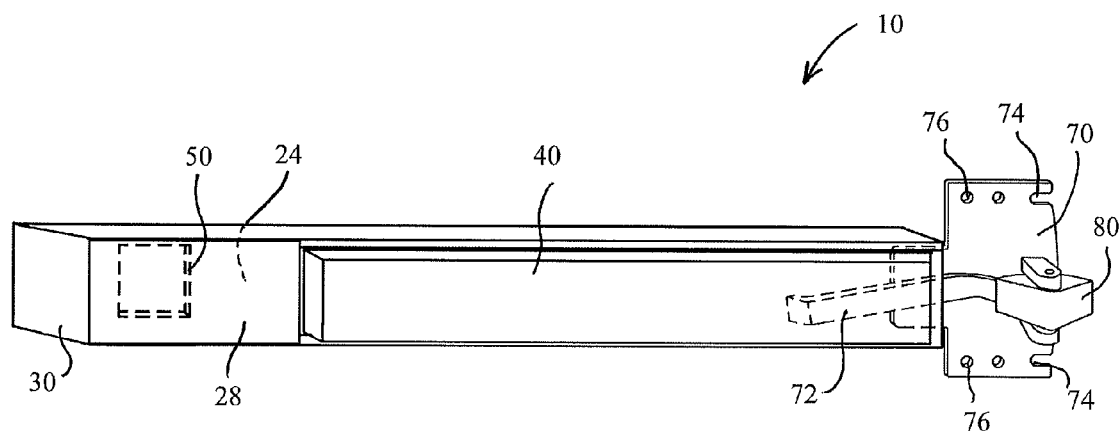
FIG. 2 is a front perspective view of the exit device shown in FIG. 1 without the chassis cover.

The present invention is directed to the construction and installation of an exit device, which is part of a lock mechanism installed on the inside of a door that swings outward. (The terms up, down, vertical and horizontal are used herein to describe direction with respect to a conventional vertical door, as shown by way of example in these drawings.) The exit device allows exit by pushing on a movable push pad or other structure that actuates the latch in a lock mechanism holding the door shut. An exit device 10 is mounted to a door 90 as shown in FIG. 1. The door 90 includes a substantially vertical planar surface for the exit device 10 to be attached, which surface extends from the side of the door adjacent the hinges 23 to the opposite free edge 25 on which the lock mechanism (not shown) and latch 80 are disposed. FIG. 2 shows the exit device 10 with lock mechanism chassis cover 81 removed. The exit device 10 includes a housing or rail 20 having a front opening 21 and a push pad 40 slidably engaged within the front opening 21. The rear portion 24 of the rail is mounted flush with the door surface. The rail 20 may be elongated with a first rail end 32 adjacent the hinge edge of the door and a second rail end 34 opposite the first rail end 32 adjacent the free edge of the door. The rail 20 may be positioned substantially horizontally on the door 90. The exit device 10 includes a permanent, fixed, closed termination at the end 30 on the first rail end 32 and a chassis 70 attached to the second rail end 34. The second rail end 34 includes under the chassis cover a chassis 70 having openings 76 and horizontally aligned slotted openings 74 extending from the chassis side edge adjacent the door free edge for securing threaded screw fasteners to the door. A latch bolt 80 is rotatably attached to the chassis 70 and a lever 72 rotates the latch bolt 80 when pressure is applied to one end of the lever 72 to release the latch bolt from a strike plate in the door frame (not shown). A first end of the lever 72 may be contacted by the push pad 40, whereby sliding the push pad 40 in a direction normal to the door surface into the front opening 21 urges the first end of the lever 72 in substantially the same direction as the push pad and moves the second end of the lever 72 toward the latch bolt 80, rotating the latch bolt 80. The exit device 10 includes a mount opening 50 along a rear portion or surface 24 of the rail 20 adjacent the door 90.

Figure 3:
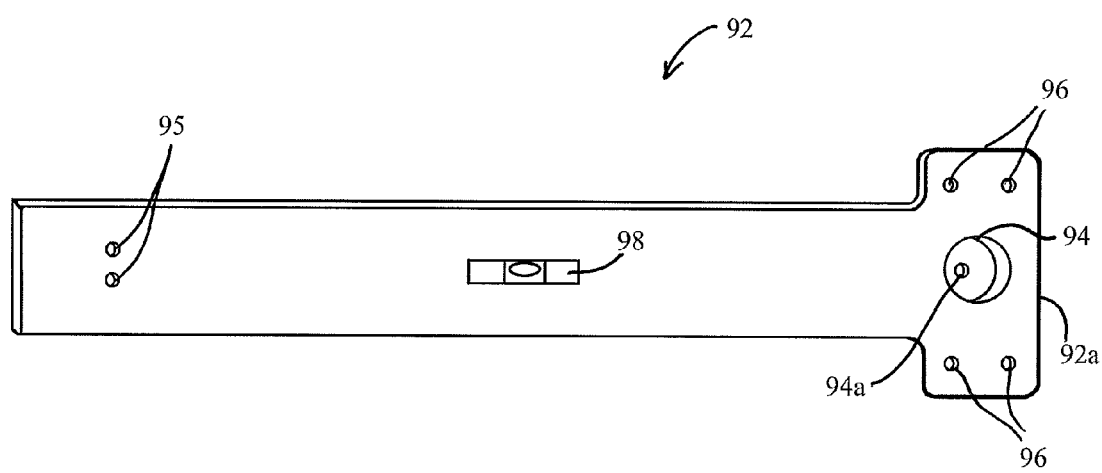
FIG. 3 is a front perspective view of an exit device door marker jig according to the present invention.

The present invention may include a door marker jig 92 that serves as an installation template as shown in FIG. 3. The jig 92 may be any substantially flat material and includes marking openings 95, 96 for marking the fastener locations on the door 90. The jig 92 may include a protrusion 94 extending from the rear surface of the jig corresponding to the location of a normally standard door hardware prep opening 99 (see FIG. 10). The door prep 99 is an opening in a door usually made by the door manufacturer to ensure the opening is in the correct location, and protrusion 94 may have the same diameter as the prep opening 99 to fit snugly therein. Protrusion 94 may also contain marking opening 94a for use in the event that there is no pre-existing prep opening in the door. The door marker jig 92 includes mount fastener marking opening 95 and one or more chassis fastener marking openings 96 for marking the door 90 at mount and chassis fastener locations. The first door marker jig opening 94 and marking openings 95, 96 may alternately be protrusions on the side of the door marker jig which lies against the door during installation of the exit device 10.

The door marker jig 92 may include a bubble or other leveling device 98 for ensuring the jig 92 is in the correct substantially horizontal or other orientation when marking the door 90. This also ensures that mount marks and chassis fastener mark made at the mount fastener points and chassis fastener points on the jig allow for level installation of the exit device 10. The mount fastener points 95 and chassis fastener point 96 may be apertures in the jig 92 for marking the door 90 with a pencil or other marking device.

FIG. 4 shows an exit device housing or rail 20 having an unformed integral end piece 30' and a front cover 28 slideable into the front of the rail 20, the end piece 30' being in a position before folding in direction 79 against rail end 32 as shown in FIG. 5. The rail 20 includes rail sides 22 with rail channels 22a for receiving the front cover and rail side ends 27 at end 32 of the rail 20. The unformed integral end piece 30' extends from a rail rear portion or panel 24 in FIG. 4 and is folded against the rail side ends to form the non-removable, integral, closed termination 30 at the rail end in FIG. 5. The rail ends 27 are at an acute angle to the rear panel 24, and end 30 fits against the ends and overlays the end of front cover 28 to prevent the front cover from being slidingly removed from the rail channels. Preferably, the rail rear portion 24, the rail sides 22 and the end termination 30 are all one piece. The front cover 28 is positioned in a plane parallel to the rear panel 24 and above the mount opening 50, and inhibits access to the mount opening in a direction normal to the plane of the rail rear portion 24. Since front cover 28 is non-removably secured to the rail sides and end piece 30 is a permanent, fixed, closed termination, there is access to end 32 of the rail other than mounting opening 50 in rear portion 24.

Figure 6:
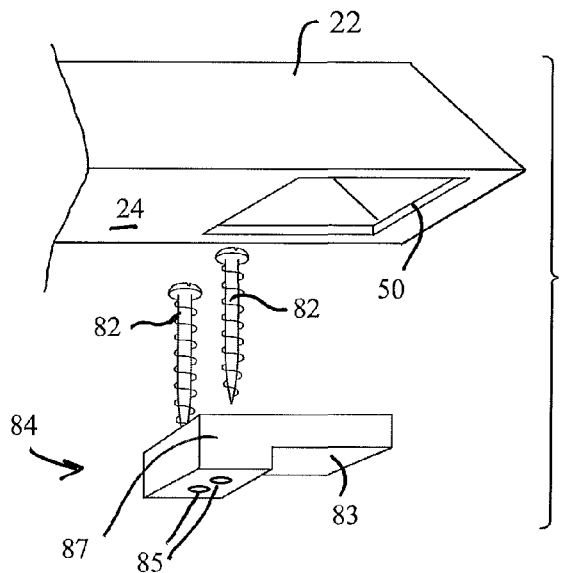
FIG. 6 is a first embodiment of the exit device mount according to the present invention.

FIG. 6 shows a first embodiment of a mount 84 for the exit device 10 according to the present invention. The mount 84 includes a base portion 87 having mount openings 85 extending through the base portion 87. The mount 84 also includes a cantilever portion 83 extending outward from the base portion 87 in a direction parallel to the plane of the door surface and which is spaced a distance from the door 90 surface approximately equal to the rail rear portion 24 thickness after installation. Threaded screw fasteners 82 may extend through the mount openings 85 and into the door 90. The threaded fastener 82 may have wood or metal screw threads for tapping into the door surface, or may have machine threads for securing in a threaded opening in the door surface. Mount opening 50 in rail rear portion 24 is at least the width and length of entire cantilevered portion 83 and base 87 to permit mount 84 to secure the rail 20 to the door 90. The width of base 87 may also be equal to the width of opening 50 in the vertical direction as mounted on the door 90.

Figure 7:
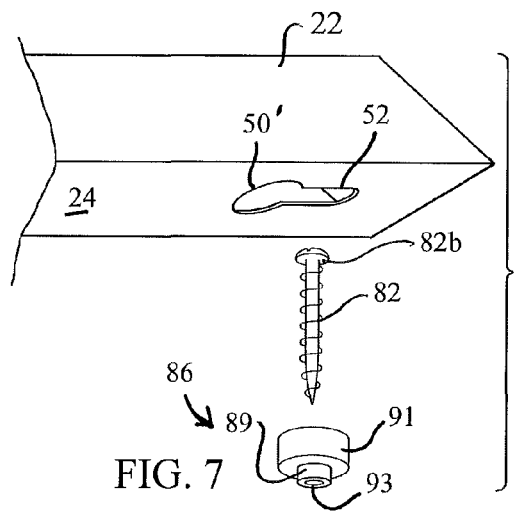
FIG. 7 is a second embodiment of the exit device mount according to the present invention.

In a second embodiment of the exit device 10, FIG. 7 shows a circular mount 86 which includes a circular base portion 89, a flange portion or cantilever portion 91 adjacent to and extending as a cantilever from the top of the base portion 89 and a mount opening 93 which extends through the base portion 89 and the flange portion 91 so that the flange portion 91 is spaced a distance from the door 90 approximately equal to the rail rear portion 24 thickness after installation. Threaded screw fasteners 82 extend through the mount opening 93 and into the door 90 to secure circular mount 86 against the door surface. Mount opening 50' in rail rear portion 24 has a diameter at least as large as the diameter of flange portion 91, and includes a contiguous keyhole slot 52 that has a width smaller than the flange portion 91, but larger than the base portion 89 to engage mount 86 and secure the rail to the door 90.

Figure 8:
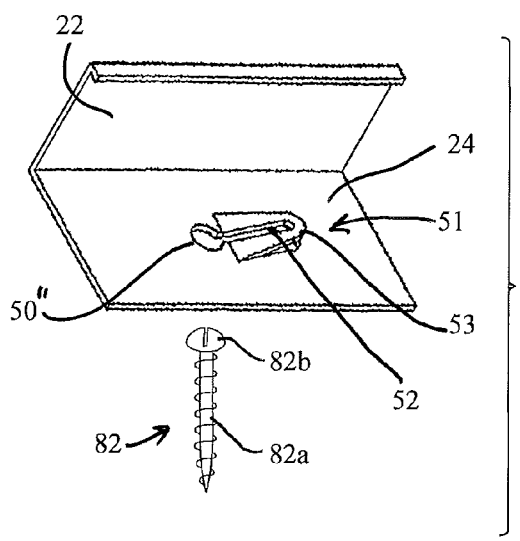
FIG. 8 is a third embodiment of the exit device mount according to the present invention.
Figure 9:
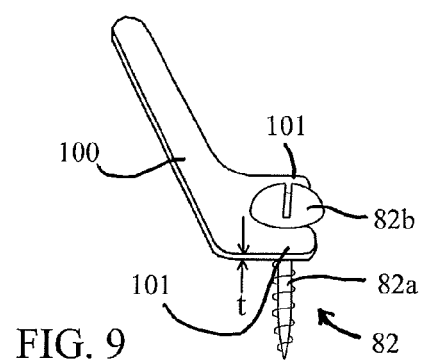
FIG. 9 is a spacer tool used in the installation of a third embodiment of the exit device mount.

In a third embodiment of the exit device 10, FIG. 8 shows a compression slot 51 for mounting the exit device, the compression slot 51 including a primary mount opening 50" contiguous with a keyhole slot 52". In this embodiment, threaded screw fastener 82 is the mount, with the helically threaded shaft 82a comprising the base and the circular head 82b comprising the cantilever portion extending outward from the base. As with the embodiment of FIG. 7, opening 50" has a diameter at least the diameter of the mount head 82b and the contiguous slot 52" has a width at least the diameter of the mount base 82a and less than the diameter of the mount head 82b. The compression segment 53 surrounding slot 52" forms a cantilevered spring extending upward from the rear portion 24 of the exit device 10 at opening 50", away from the door. FIG. 9 shows a spacer tool 100 having a thickness (approximately the same thickness as the rail rear portion 24) for setting the threaded screw fastener 82 to the proper depth. When setting the threaded fastener 82, the spacer tool fork arms 101 straddle the fastener shaft 82a and the fastener 82 is rotated into the door until the fastener head 82b is lightly pressing against the spacer tool fork arms 101, so that head 82b is spaced from the door surface approximately equal to the rail rear portion 24 thickness. Tool 100 is removed after installation of fastener 82. When rail opening 52" is placed over the fastener head 82b and the rail portion is slid so that fastener shaft 82a enters slot 52", compression segment 53 is urged toward the door surface and tightens the exit device 10 to the door 90. Other chassis mounts may also be employed in place of those shown herein.

Figure 10:
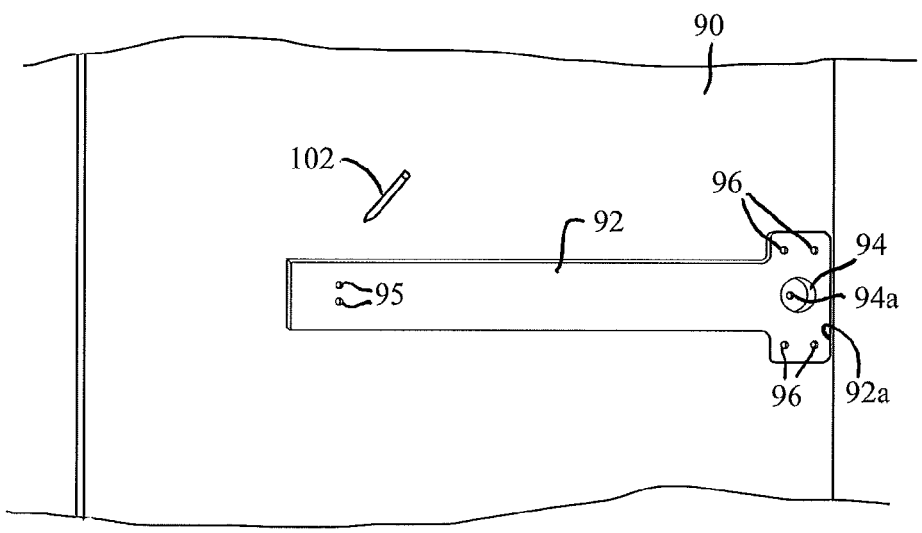
FIG. 10 shows a first step for the installation of the exit device according to the present invention.
Figure 11:
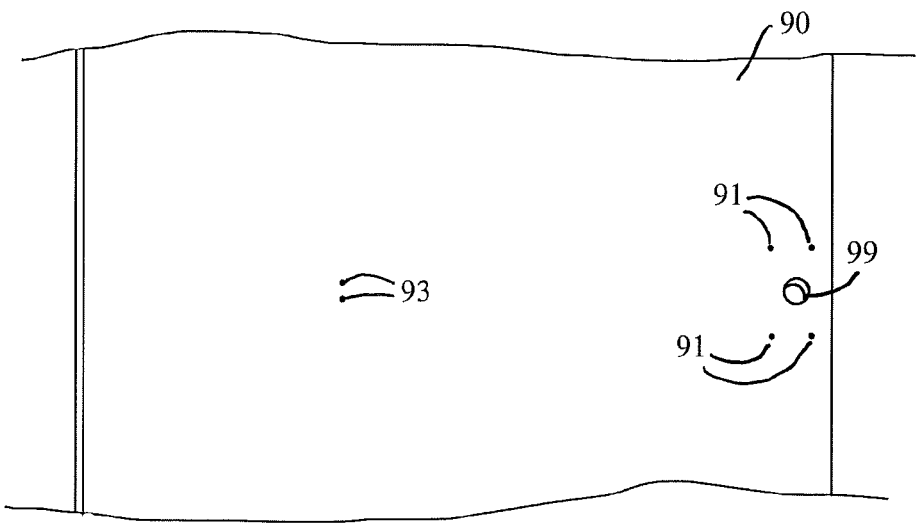
FIG. 11 shows a second step for the installation of the exit device according to the present invention.

FIGS. 10-16 show steps for a first method of installing and using the exit device with the permanently closed termination at the end according to the present invention. The exit device 10 shown has the non-removable front rail portion 28 and integral end termination 30, which for flush mounting of the rail to the door surface requires that the end 32 of the rail portion be installed blind, i.e., without direct access to the mount opening 50, particularly in a direction normal to the rail rear portion 24. The method as shown in FIG. 10 includes placing the door marker jig 92 against the door 90 so that jig protrusion 94 extends into the door prep opening 99, moving the jig end opposite the protrusion 94 up or down to horizontally level the jig 92 while maintaining the jig protrusion 94 in the door prep opening 99, and marking the door at mount fastener openings 95 and one or both chassis fastener openings 96. The door marker jig 92 is then removed from the door 90, leaving mount fastener marks 93 and a chassis fastener mark 91, as shown in FIG. 11. If the door contains no prep hole, the door marker jig may be flipped over so that the opposite surface is placed against the door, with protrusion 94 extending away from the door surface. Jig end 92a is then abutted against the door frame adjacent the door free edge (not shown) and positioned at the desired height above the floor. In addition to marking the door at fastener openings 95 and 96, the door is marked at protrusion opening 94a for the proper prep hole location. After the desired markings are made for the fasteners, the door is drilled to receive the fasteners. If the door contained no prep hole, it may be drilled out at the marked protrusion opening.

Figure 12:
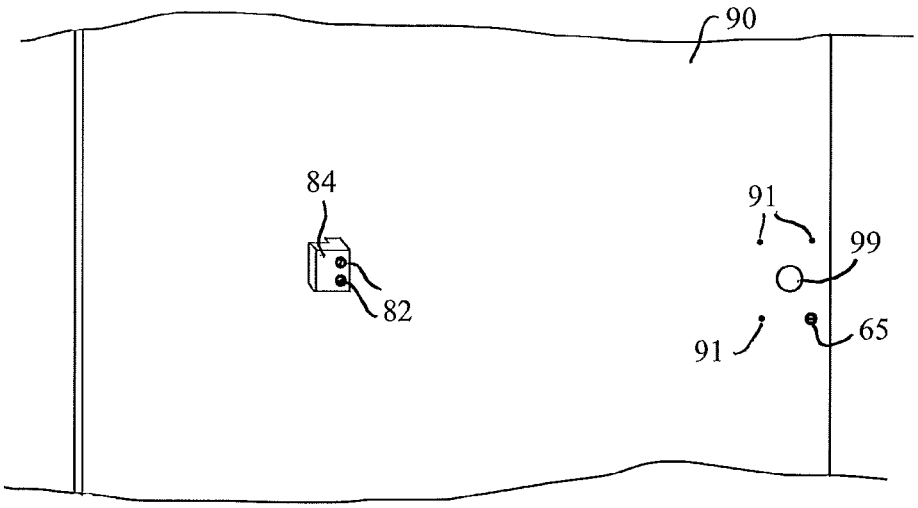
FIG. 12 shows a third step for the installation of the exit device according to the present invention.

The method as shown in FIG. 12 includes the step of fastening the mount 84 securely to the door 90 using the mount fasteners 82 at the mount fastener marks 93, with the cantilever portion pointing in the direction of the door hinges, and fastening the chassis fastener 65 to the door 90 at the chassis fastener mark 91. In place of chassis mount 84, any other chassis mount may be employed. The chassis fastener 65 may include a threaded portion and a head as previously described for fastener 82, and may be similarly installed so that the head is left a spacing distance from the door 90 after fastening to allow the chassis slot 74 to slide freely and engage the threaded portion of the chassis fastener 65 during placement of the exit device 10 on the door 90.

Figure 13:
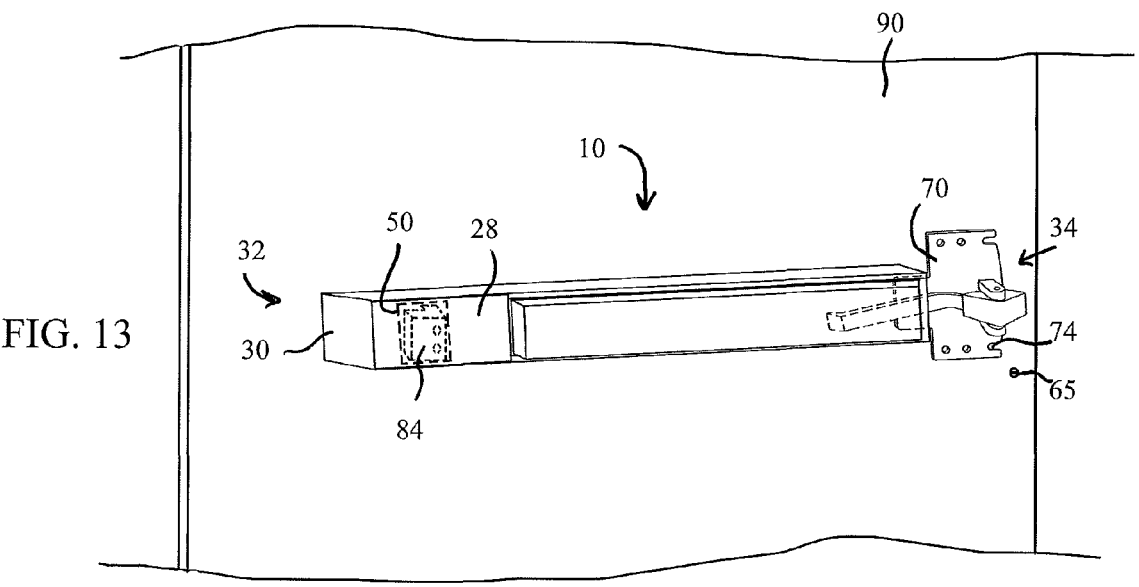
FIG. 13 shows a fourth step for the installation of the exit device according to the present invention.
Figure 14:
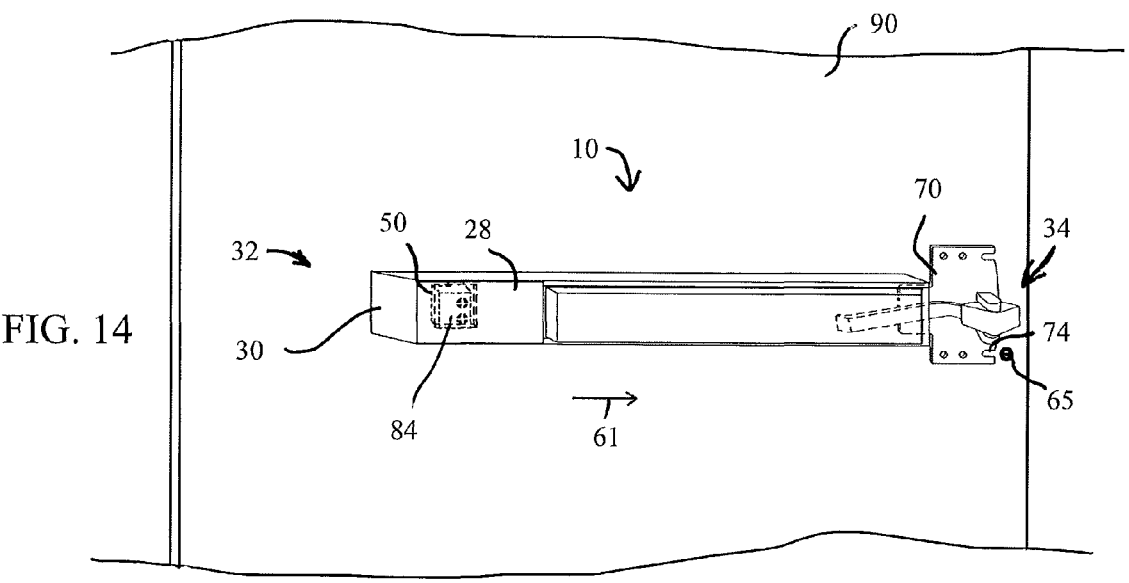
FIG. 14 shows a fifth step for the installation of the exit device according to the present invention.
Figure 17:
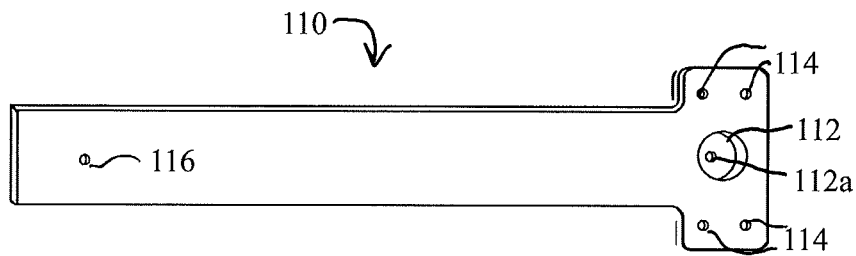
FIG. 17 is a front elevational view of a door marker jig for the second embodiment of the method of installation.
Figure 18:
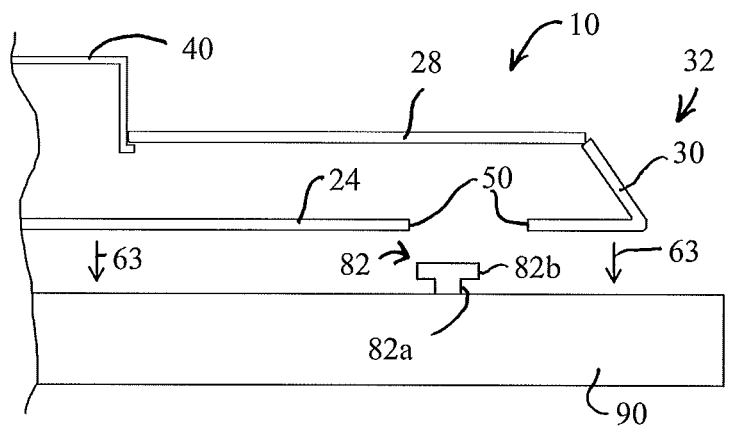
FIG. 18 shows a first step in a second embodiment for the installation of the exit device according to the present invention showing a cross sectional view of the exit device at cut lines A-A of FIG. 1.
Figure 19:
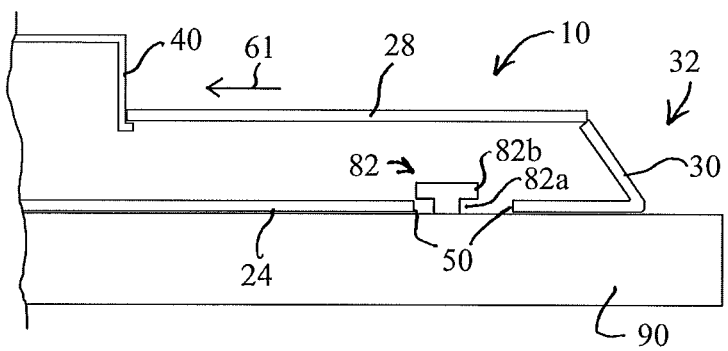
FIG. 19 shows a second step in the second embodiment for the installation of the exit device according to the present invention.

The subsequent method step as shown in FIG. 13 includes aligning the exit device mount opening 50 with the mount 84, and placing the mount opening 50 over the mount 84 until the mount opening 50 and rail rear portion 24 contact and are flush with the door 90 surface as shown in FIG. 14. The method then includes sliding the exit device 10 horizontally and parallel to the plane of the door 90 surface in the direction of arrow 61 until the edge of opening 50 is captured under the mount cantilever portion and the chassis slot 74 aligns with the chassis fastener 65, and then engaging the chassis slot 74 with the chassis fastener 65 as shown in FIG. 15. The mount cantilever portion prevents the edge of mount opening 50, and the end 32 of the rail, from moving outward from the door surface and downward, and slot 74 slid loosely over chassis fastener 65 prevents rail end 34 from moving outward from the door surface and downward. Since the rail is fully supported from movement from the door, the installer may then release hold of the exit device. Chassis fastener 65 may then be tightened to attach the rail end 34 and chassis 70 firmly to the door 90. The mount base may be the same width as the mount opening in the vertical direction to fit snugly and prevent the end 32 of the rail from moving upward and downward. The distance from the door 90 to the cantilever portion 83 may be the same as the thickness of the rail rear portion 24 at opening 50 to allow the rail 20 to fit snugly against the door in a sliding fit to prevent the exit device from moving outward with respect to the door. Additional chassis fasteners 65 may be used to secure the chassis 70 to the door 90 and prevent the opposite end 34 of the rail from moving upward and downward, as shown in FIG. 16. The chassis cover 81 is then attached to the chassis as shown in FIG. 1.

A second method for installing the exit device 10 is shown in FIGS. 17-20 showing a cross sectional view of the end 32 of exit device 10 at cut lines 20-20 of FIG. 1. The method includes placing a door marker jig 110 shown in FIG. 17 against the door 90 with jig protrusion 112 disposed in door prep opening 99, leveling the jig 110 while maintaining the protrusion 112 in the door prep opening 99, and marking the door at chassis mark 114 and mount mark 116. (in the event of no door prep opening, the jig is flipped over and the door prep opening is marked, as described previously.) The jig 112 is then removed from the door, leaving mount fastener and chassis fastener marks (and optionally door prep opening) to be drilled.

Figure 20:
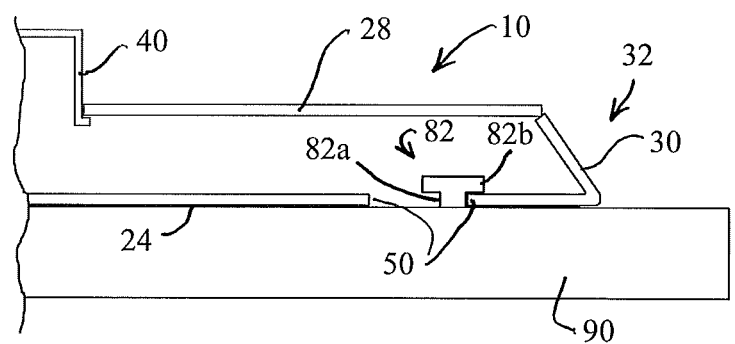
FIG. 20 shows a third step in the second embodiment for the installation of the exit device according to the present invention.

The second method includes the step of fastening the mount to the door 90, wherein the mount is fastener 82, at the mount fastener marks (FIG. 18) and fastening the chassis fastener to the door at the chassis fastener mark (not shown). The fastener 82 includes a threaded base portion 82a and a cantilevered head 82b which, when used for the mount, is left a distance from the door 90 after fastening equal to the thickness of the rail rear portion 24. The rail is then positioned in direction 63 (FIG. 18) with rear portion 24 flush against the surface of door 90 and slid in direction 61 (FIG. 19) until the mount base 82a contacts the edge of mount opening 50 (FIG. 20). At that position the chassis fastener is tightened in the chassis slot and a fastener placed in remaining chassis openings (not shown) to complete placement of the exit device 10 on the door 90.

Thus, the present invention provides an improved exit device having a rail with a non-removable front portion and closed termination at the end opposite the lock chassis, which prevents damage during the lifetime of the device. The present invention also provides an improved method of installing the rail securely to the door, since the interior of the rail is not directly accessible at the end opposite the lock chassis.

While the present invention has been particularly described, in conjunction with a specific preferred embodiment, it is evident that many alternatives, modifications and variations will be apparent to those skilled in the art in light of the foregoing description. The method of the present invention may modify or reorder the steps described herein, such as positioning the mount with the cantilever portion pointing in the direction of the door free edge and sliding the rail in the opposite direction, and/or engaging fasteners 82 in the openings 74, 76 of rail end 34 only after the rail is slid over the mount. Washers such as a wave washer may be used with the threaded fasteners for the mount or chassis openings, in which case the fastener heads are positioned further from the door surface to account for the thickness of the washer between the head and door. Other modifications to the method are also possible. It is therefore contemplated that the appended claims will embrace any such alternatives, modifications and variations as falling within the true scope and spirit of the present invention.

Thus, having described the invention, what is claimed is:

The invention claimed is:

1. A method for installing an exit device on a door comprising:
   providing a door having a substantially planar surface for mounting an exit device, the surface having a first end near a hinge and a second end opposite the hinge;
   providing an exit device including an elongated rail having opposite first and second ends and a rear portion with a first opening adjacent the first rail end for attachment to the door surface, the first rail end further having a front portion that inhibits access to the first rail opening in a direction normal to the rail rear portion;
   providing a mount having a cantilevered portion extending therefrom;
   securing the mount to the door at the surface first end such that the mount cantilevered portion provides a space between the cantilevered portion and the door;
   placing the entire rail rear portion in contact with and flush against the door surface such that the mount extends through the first rail opening;
   sliding the rail along the plane of and in contact with the door surface to engage the rail rear portion adjacent the first rail opening between the mount cantilevered portion and the door; and
   securing the second rail end to the door surface second end from movement along the plane of the door and prevent the first rail opening from disengaging from the mount.

2. The method of claim 1 wherein exit device includes a non-removable closed termination at the first end of elongated rail.

3. The method of claim 1 wherein the mount comprises a base, and the cantilevered portion comprises a head extending outward from the base parallel to the plane of the door surface.

4. The method of claim 1 wherein the mount comprises a screw having a threaded shaft base, and the cantilevered portion comprises a screw head extending outward from the threaded shaft base.

5. The method of claim 3 wherein the first rail opening includes an opening having a diameter at least the diameter of the mount head and a contiguous slot having a width at least the diameter of the mount base and less than the diameter of the mount head.

6. The method of claim 5 wherein a portion of the rail rear portion adjacent the contiguous slot forms a cantilever spring extending from the opening having a diameter at least the diameter of the mount head.

7. The method of claim 3 wherein the mount base is circular and has an opening therein for securing the mount to the door surface, and the mount head is circular and has a diameter larger than the diameter of the base.

8. The method of claim 1 wherein the exit device rail rear portion has a thickness, and further including providing a tool having a thickness at least that of the rail rear portion thickness, and using the tool to secure the mount to the door at the surface first end such to ensure that that the mount cantilevered portion provides a space between the cantilevered portion and the door such that the rail rear portion adjacent the first rail opening fits snugly between the mount cantilevered portion and the door.

9. The method of claim 1 wherein the exit device rail rear portion has a second opening adjacent the second rail end, and wherein a fastener is inserted through the second rail opening to secure the second rail end to the door surface.

10. The method of claim 9 wherein the elongated rail first and second ends extend in a first direction and wherein the second opening in rail rear portion includes a contiguous slot extending in the first direction.

11. The method of claim 9 wherein the fastener is inserted into the door prior to placing the rail against the door surface, and after sliding the rail along the plane of the door surface to engage the rail rear portion between the mount cantilevered portion and the door, the rail is fully supported from movement from the door.

12. The method of claim 9 further including:
providing a door marker jig having a first alignment opening for marking a location on the door for the mount and a second alignment opening for marking a location on the door for the second opening;
placing the jig on the door at a desired location so that the first alignment opening is adjacent the door surface first end and the second alignment opening is adjacent the door surface second end;
marking the door surface through the first and second jig alignment openings;
removing the jig;
securing the mount to the door surface at the mark for the mount; and
securing the second opening fastener to the door surface at the mark for the second opening.

13. The method of claim 12 further including placing the second jig alignment opening adjacent a location for a lock chassis on the door surface second end, and aligning the door marker jig substantially horizontally across the door surface.

14. The method of claim 12 wherein the door includes a door hardware prep opening and the door marker jig includes a protrusion for fitting into the prep opening, and including placing the door marker jig protrusion into the door hardware prep opening before marking the door surface through the first and second jig alignment openings.

15. The method of claim 14 wherein the door marker jig includes a leveling device, and including aligning the jig horizontally using the leveling device by moving the end of the jig opposite the protrusion.

\* \* \* \* \*